United States Patent [19]

Earl

[11] Patent Number: 4,512,357

[45] Date of Patent: Apr. 23, 1985

[54] PRESSURE TRANSDUCER

[75] Inventor: Webster B. Earl, Lewisville, N.C.

[73] Assignee: Fairchild Industries, Inc., Germantown, Md.

[21] Appl. No.: 457,461

[22] Filed: Jan. 12, 1983

[51] Int. Cl.[3] .............................................. G05D 16/00

[52] U.S. Cl. .............................................. 137/82; 251/129

[58] Field of Search ..................... 137/82, 85; 251/129, 251/337

[56] References Cited

U.S. PATENT DOCUMENTS

| | | | |
|---|---|---|---|
| 3,173,437 | 3/1965 | Adams | 137/82 |
| 3,433,256 | 3/1969 | Stillhard | 251/139 X |
| 3,529,620 | 9/1970 | Leiber | 137/269 |
| 3,621,862 | 11/1971 | Wojtecki | 137/82 |
| 3,645,293 | 2/1972 | Pedersen | 137/82 UX |

*Primary Examiner*—Alan Cohan
*Attorney, Agent, or Firm*—Michael W. York

[57] ABSTRACT

An electric to pneumatic transducer that utilizes an electrical coil and a magnet assemble that is suspended by a plurality of springs. The magnet assembly acts upon a nozzle assembly in such a manner that movement of the magnet assembly causes a change in the release of pneumatic fluid from the nozzle assembly. The movement of the magnet assembly is accomplished by increasing or decreasing the electrical current that passes through the electrical coil with a corresponding increase in pressure or decrease in pressure exerted by the magnet assembly upon the nozzle assembly. The unique configuration of the springs also allows free up and downward vertical movement of the magnetic assembly and restricts or prevents sideward movement of the magnet assembly.

10 Claims, 7 Drawing Figures

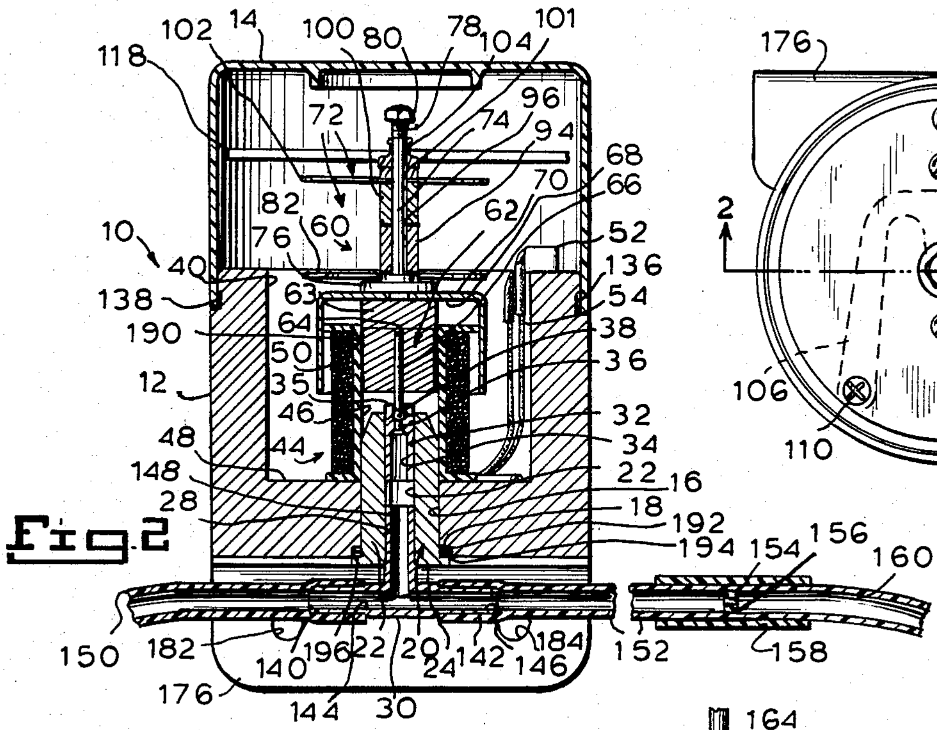
Fig. 2
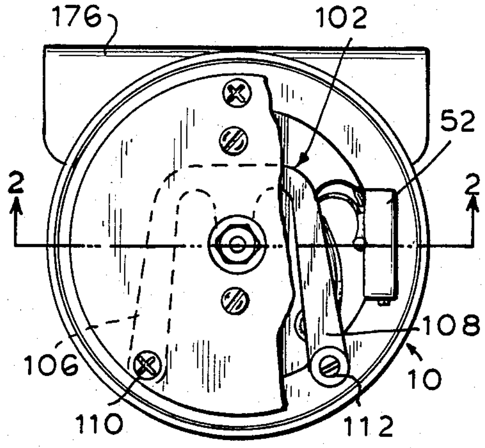
Fig. 1
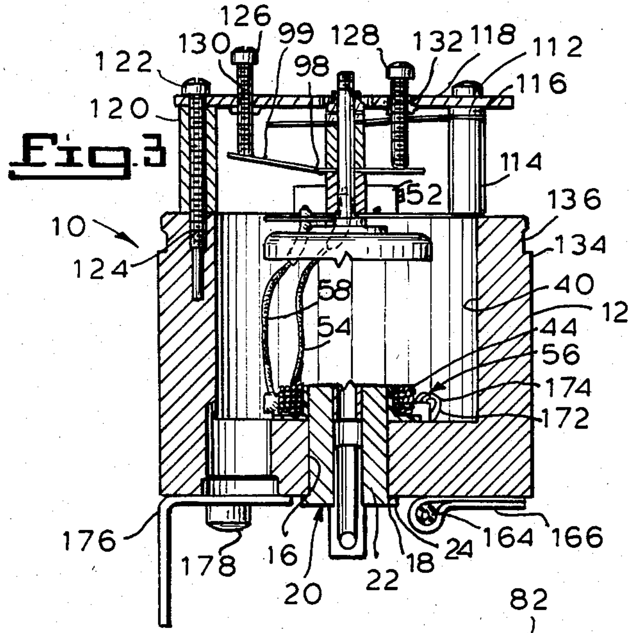
Fig. 3
Fig. 4
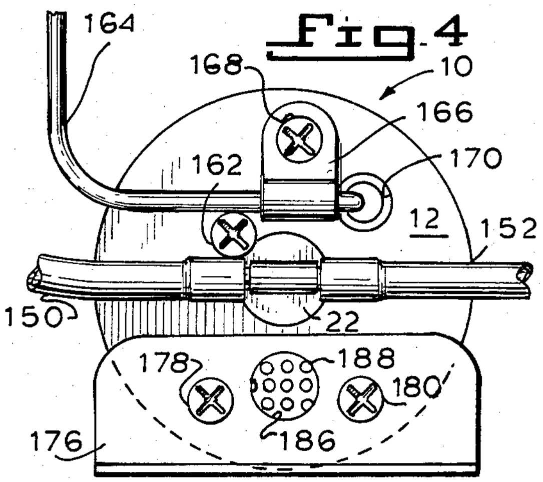
Fig. 6
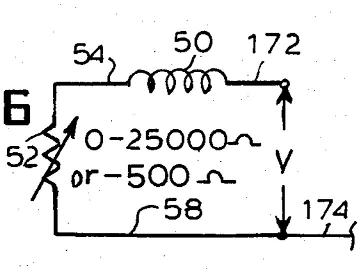
Fig. 5
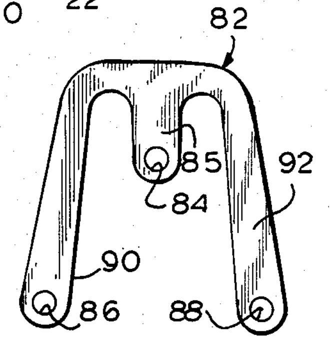
Fig. 7
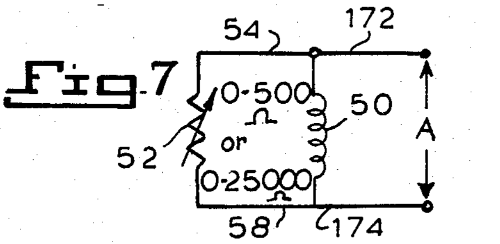

PRESSURE TRANSDUCER

BACKGROUND OF THE INVENTION

Pressure transducers such as electric to pneumatic transducers have been in use for a number of years, and they have a number of important applications. However, in general these transducers have been comparatively expensive and, in addition, the size of such transducers has to some extent limited their applications. In addition, these pressure transducers have in general had a limited range of input signals. Also, these pressure transducers in general have not been easy to clean and inspect.

The pressure transducer of this invention overcomes these problems associated with previous transducers and provides a compact pressure transducer that has good accuracy for its low cost. This pressure transducer is also capable of being utilized with a wide range of input signals and easy access is provided to the nozzle and ball of the pressure transducer for easy cleaning and inspection. This pressure transducer also has the capability of being used as a voltage to pressure transducer or as a current to pressure transducer.

BRIEF DESCRIPTION OF THE INVENTION

This invention relates to pressure transducers and more particularly to electric to pneumatic pressure transducers.

It is an object of the present invention to provide an electric to pneumatic transducer that is compact.

It is also an object of the present invention to provide an electric to pneumatic transducer that provides good accuracy and is low in cost.

It is also an object of the present invention to provide an electric to pneumatic transducer that can be utilized with a wide range of input signals.

It is also an object of the present invention to provide an electric to pneumatic transducer that provides easy access to the nozzle assembly for the purposes of cleaning and/or inspection.

It is also an object of the present invention to provide an electric to pneumatic transducer that is capable of being utilized as a voltage to pressure transducer or as a current to pressure transducer.

It is also an object of the present invention to provide an electric to pneumatic transducer that has comparatively few parts.

It is also an object of the present invention to provide an electric to pneumatic transducer that is easy to manufacture.

It is also an object of the present invention to provide an electric to pneumatic transducer that does not require the maintaining of close tolerances during its manufacture.

The present invention provides an electric to pneumatic transducer including nozzle means for releasing air or a gas or gases, inlet means for transmitting air or a gas or gases to the nozzle means and means acting upon the nozzle means for varying the amount of air or a gas or gases released from the nozzle means. The electric to pneumatic transducer also includes electrical activating means operatively associated with the means for acting upon the nozzle means for controlling the means for acting upon the nozzle means in accordance with an electrical signal. The means for acting upon said nozzle means includes means for controlling the movement of the means for acting upon the nozzle means.

BRIEF DESCRIPTION OF THE DRAWINGS

The invention will be hereinafter more fully described with reference to the accompanying drawings in which:

FIG. 1 is a top plan view of the pressure transducer of the present invention;

FIG. 2 is a cross sectional view of the pressure transducer illustrated in FIG. 1 taken substantially on the line 2—2 thereof;

FIG. 3 is a side elevational view of the pressure transducer illustrated in FIGS. 1 and 2 with portions of the transducer omitted for clarity;

FIG. 4 is a bottom plan view of the pressure transducer illustrated in FIGS. 1, 2, and 3;

FIG. 5 is a top plan view of a spring utilized in pressure transducer illustrated in FIGS. 1 through 4;

FIG. 6 is an electrical schematic drawing of one embodiment of the electric circuit utilized in the pressure transducer illustrated in FIGS. 1 through 4; and FIG. 7 is an electrical schematic of another embodiment of the electric circuit utilized in the pressure transducer illustrated in FIGS. 1 through 4.

DETAILED DESCRIPTION OF THE PREFERRED EMBODIMENTS

The pressure transducer of the invention is illustrated in FIGS. 1, 2, 3, and 4 and is designated generally by the number 10. The pressure transducer 10 comprises a generally cylindrical shaped housing member 12 and a dish-shaped plastic cover member 14 that is adapted to fit on top of the housing assembly 12. A circular cross-section shaped aperture 16 is located in the central lower portion of the housing assembly 12. An enlarged countersink 18 is located adjacent to the lower portion of the aperture 16. The apertures 16 and 18 are sized and shaped to receive nozzle means for releasing air or a gas or gases designated generally by the number 20.

The nozzle means 20 comprises a generally cylindrical hollow nozzle member 22 that is sized and shaped to fit within the aperture 16. The nozzle member has an enlarged flange 24 located on its lower portion that is sized and shaped to be located outside of and below the aperture 18. The nozzle member 22 has a centrally located circular shaped aperture 26. One portion 28 of a hollow T-fitting 30 is pressed into place in the lower portion of the aperture 26. A nozzle insert 32 is located in the upper end portion of the aperture 26. This nozzle insert 32 has a generally circular enlarged aperture 34 that is connected to a smaller aperture 36. Located above the aperture 36 in a pocket in the upper portion of the nozzle insert 32 is a generally spherical ball 38.

The housing member 12 has a large centrally located circular cross section aperture or well 40 that is located immediately adjacent to the upper end of the aperture 16. This aperture extends upward to the upper surface of the housing assembly 12. It will be noted that the upper end of the hollow nozzle member 22 extends upward into this well 40. A coil assembly 44 has a hollow central opening 46 which is located around this upper portion of the hollow nozzle member 22 and the coil assembly 44 is cemented into place on the bottom surface 48 of the well 40. The wound wire 50 of the coil assembly 44 is connected to an adjustable resistor or trimmer 52 by the conductor 54. The trimmer 52 is in turn connected to one side of the electrical input leads 56 by the conductor 58 and the other end of the coiled conductor 50 is connected by the electrical conductor to the other side of the input leads.

Located immediately above the hollow nozzle member 22 and partially around the coil assembly 44 are means acting upon said nozzle means 20 for varying the amount of air or gas or gases released from said nozzle means 20 that is designated generally by the number 60. The means for acting upon the nozzle means 60 comprises magnetic means that comprises a cylindrical shaped magnet assembly 62 that is sized and shaped to fit within the upper portion of the aperture 46 in the coil assembly 44. This magnet assembly 62 has a centrally located circular cross section aperture 64 extending from its lower surface upward that is sized and shaped to receive the upper portion of a pin member 66. The lower surface of this pin member 66 rests upon the upper surface of the spherical ball 38. The upper portion of the magnet assembly 62 is secured in place adjacent the inner surface 68 of a hollow cup-shaped member 70 that partially extends around the outer surfaces of a portion of the coil assembly 44.

The means for acting upon said nozzle means 60 also includes spring means designated generally by the number 72 that is located immediately above the hollow cup shape number 70. The spring means includes a magnetic assembly support rod 74 that has a lower enlarged flat portion 76 that is centrally located and bonded to the upper surface of the cup shape member 70 in a manner well known to those skilled in the art by the use of Loc-tite Super Bonder number 430 or the like. The upper portion of the magnetic assembly support rod 74 has a threaded portion 78 that is adapted to receive a suitable nut such as the nut 80. located immediately above the enlarged portion 76 is a substantially M-shaped leaf spring 82. Spring 82 is best illustrated in FIG. 5. As best illustrated in FIG. 5, the M-shaped leaf spring has a hole 84 that is located at the lower central portion 85 of the M. Holes 86 and 88 are located at the respective lower ends of the outer legs 90 and 92 of the M. The hole 84 is sized and shaped so that it can receive the upward extending magnetic assembly support rod 74.

A hollow cylindrical spacer 94 is provided immediately above the spring 82 and the hollow aperture 96 of the spacer 94 receives a portion of the magnetic assembly support rod 74. A generally rectangular shaped and generally flat spring 98 is located immediately above the spacer 94. This spring 98 has a portion 99 as best illustrated in FIG. 3 that is bent slightly upward at an angle of substantially nine degrees in the free state. Another hollow spacer 100 that is substantially identical to the spacer 94 is located immediately above the spring 98 and this spacer 100 has an aperture 101 that receives a portion of the magnetic assembly support rod 74. Another substantially M-shaped flat leaf spring 102 is located immediately above the spacer 98. This M-shaped spring 102 is substantially identical to the substantially M-shaped spring 82 set forth in FIG. 5. A washer 104 is located immediately above the M-shaped spring 102 and as previously indicated the nut 80 is threaded on the upper threaded portion 78 of the magnetic assembly support rod 74.

The means for acting upon the nozzle means 60 including the magnetic means 59 and the spring means 72 are located and suspended by means of the outer ends of the legs 90 and 92 of the substantially M-shaped spring 82 and the outer ends of the legs 106 and 108 of the substantially M-shaped spring 102. In this connection, it will be noted in FIGS. 1 and 3 that screws 110 and 112 pass through the holes 86 and 88 in the outer ends of the respective legs 90 and 92 of the substantially M-shaped spring 82. A hollow cylindrical spacer or standoff member 114 is located immediately above the legs 106 and 108 of the spring 82 around the screws 110 and 112. For clarity, only one screw 112 and standoff member 114 are illustrated in FIG. 3. In a similar manner, the outer ends of the legs 106 and 108 of the substantially M-shaped spring 102 and located above the standoff members 114 by means of the screws 110 and 112 that pass through holes in the outer ends of the legs 106 and 108 that are similar to the holes 86 and 88 in the outer ends of the legs 90 and 92 of the spring 82.

Another short hollow cylindrical spacer or standoff member 116 is located above each of the ends of the legs 106 and 108 of the spring 102 and the screws 110 and 112 also pass through appropriately spaced and sized holes in a thin circular retainer plate member 118 that is located immediately above the standoff members 116. Another hollow cylindrical standoff member 120 and a screw 122 also assist in supporting the retainer plate member 118. The screw 112 passes through a hole in the outer rim portion of the retainer plate member 118 and through the hollow interior of the standoff member 120 and then it is threaded into a threaded hole 124 in the upper end portion of the housing member 12. A zeroing screw 126 and a stop screw 128 are also threaded into the respective threaded holes 130 and 132 in the retainer plate member 118. The zero screw 126 is used to contact the end 99 of the spring 98 to adjust the position of the means for acting upon the nozzle means 60 and the stop screw 128 is used to adjust the upper limit of travel of the means for acting upon the nozzle means 60.

The upper end portion 134 of the housing member 12 has a circumferential recessed portion 136 that receives the lower circular lip portion 138 of the plastic cover member 14. This cover member serves to protect the components located in and above the housing member 12.

As best illustrated in FIGS. 2 and 5, the T-fitting 30 has a tubular output portion 140 and an oppositely located tubular input portion 142 whose respective apertures 144 and 146 are in fluid communication with the aperture 148 of the portion 28. The output portion 140 is connected to a section of plastic tubing 150 that directs the output fluid to a suitable location. In a similar manner the input portion 142 is connected to a section of plastic tubing 152 that serves to direct the supply fluid to the T-fitting 30. An orifice member 154 that has a suitable size orifice 156 is located within the input tube 152 at a location in the vicinity of the input portion 142 of the T-fitting 30. This orifice member 154 is held in place by a section of plastic heat shrinkable tubing 158 that surrounds the adjacently located portion 160 of the input tube 152.

As best illustrated in FIG. 4 a screw 162 is located in a hole in the bottom of the housing assembly 12 at a location where a portion of the head of the screw 162 contacts the flange 24 of the nozzle member 22 and secures the nozzle member 22 and the associated T-fitting 30 in place in the bottom portion of the housing assembly 12. This screw 162 can be readily removed and then the nozzle member 22, associated T-fitting and connected tubing 150 and 152 are readily removable from the housing member 12 and in view of this the screw 162 comprises means associated with the nozzle means comprising the nozzle member 22 for permitting ready access to the nozzle means for purposes of repair, cleaning or replacement.

As illustrated in FIGS. 3 and 4 an electrical input wire 164 is clamped to the bottom of the housing assembly 12 by a common clamp 166 and associated screw 168 and a portion of the electrical wire 164 extends upward through a partially sealed hole 170 in the base of the housing member 12. As illustrated in FIG. 3 this wire 164 has leads 56 comprising two leads 172 and 174 that are connected to wire 50 of the coil assembly 44 in one embodiment.

As best illustrated in FIGS. 2, 3 and 4 a mounting bracket 176 is connected to the underside of the housing member 12 by means of the screws 178 and 180. This bracket has two mounting holes 182 and 184 for mounting the pressure transducer 10 at a suitable location. It will also be noted in FIG. 4 that a circular hole 186 is located in the mounting bracket 176 substantially between the screws 178 and 180 and that this hole 186 exposes a screened vent 188 located in the bottom underside of the housing member 12.

FIG. 6 illustrates schematically how the electrical components of the pressure transducer 10 are connected so that it functions as a voltage to pressure transducer. In this configuration or embodiment one of the input leads or electrical conductors such as the lead 172 would be connected to one end of the wound wire 50 of the coil assembly 44 and the other end of the wound wire 50 would be connected to the variable trimmer resistor 52. The other lead or electrical conductor 58 from the trimmer 52 would be connected to the other input lead or electrical conductor 174. The coil is made by winding number 36 copper wire around a hollow plastic core 190 approximately one-half inch in diameter to provide substantially 45,000 turns of the wire 50. The trimmer should be variable from about 0 to about 500 ohms for a 0 to 9 volt input represented by the letter V. In the preferred embodiment the trimmer 52 is a general purpose multiturn cermet trimmer that is readily available. This type of connection is also illustrated in FIG. 3.

FIG. 7 illustrates schematically how the electrical components of the pressure transducer 12 are connected so that it functions as a current to pressure transducer. In this configuration or embodiment one end of the coiled wire 50 would be connected to the input lead 172 and the other end of the wire 50 would be connected to other input lead 174. The same trimmer 52 would be used for a 10 to 50 milliampere input represented by the letter A. The trimmer 52 would be connected to one end of the wire 50 and the lead 172 via the lead or electrical conductor 54 and connected to the other end of the wire 50 and the lead 174 via the lead 58 so that the trimmer 52 and the coiled wire 50 are connected in parallel instead of the series connection set forth in FIG. 6. It has also been determined that a trimmer that would be variable from about 0 to about 25,000 ohms performed satisfactory for an input of about 4 to about 20 milliamperes. It will be appreciated by those skilled in the art that other appropriate trimmer values can be used with different input voltages or currents.

The pressure transducer 10 is made and used in the following manner. The housing assembly 12 is cast from a suitable metal such as aluminum in a manner known to those skilled in the art and the various holes for screws such as the screw 162 are drilled and topped in a conventional manner. The plastic cover 14 can comprise a modified off the shelf item or it can be formed from a suitable plastic by moulding or the like in a manner well known to those skilled in the art. The substantially M-shaped leaf springs such as the spring 82 are stamped from suitable spring steel sheet or burillium copper sheet in a manner well known to those skilled in the art as is the spring 98. The various standoffs such as the standoff 120, the spacers such as the spacer 100, and the nozzle member 22 are machined from suitable metal stock in a manner known to those skilled in the art.

As previously indicated the coil assembly 44 is manufactured by winding the wire 50 around a plastic core 190 that is shaped like a spool. As indicated previously the core is approximately one-half inch in diameter and the wire 50 is a number 36 copper magnet wire that is wound about the core 190 to provide substantially 4500 turns of wire.

The retainer plate member 118, the cup shaped member 70 and the mounting bracket 176 can all be made in a conventional manner from steel stampings. However, the cup shaped member 70 and mounting bracket 176 require forming in a conventional manner after the stamping process. The magnetic assembly support rod 74 is machined from a suitable material such as aluminum and is threaded at its upper end to provide a threaded portion 78 for receiving the nut 80. In a similar manner, the nozzle insert 32 is machined from a suitable material such as type 303 stainless steel in a conventional manner. In this connection it should be noted that two substantially perpendicular slots, only one of which is shown in FIG. 2 and designated by the number 35, are machined in wall the nozzle insert 32 that surrounds the outer end portion of the enlarged aperture 34 in a conventional manner known to those skilled in the art.

The magnet 62 comprises a cylindrical shaped permanent magnet member 63 that is a HICOREX 90C-91A or a similar material available from Hitachi Magnetics of Edmore, Michigan and a cylindrical shaped pole piece 65 that is bonded in a conventional manner to the underside of the permanent magnet member 63. Th pole piece is machined from AISI 1117 or 11L17 steel and is drilled to provide the hole or aperture 64 that is sized to receive the pin member 66 that is made in a conventional manner from steel.

As previously indicated the trimmer 52 can be any common multiturn cermet trimmer. The spherical ball 38 should be made from synthetic sapphire or synthetic ruby and may be obtained from Industrial Tectonics, Inc. of Ann Arbor, Michigan. The orifice member 154 is made from brass with the orifice 156 itself being made from synthetic sapphire. The vent screen 188 can be manufactured from flat perforated brass sheet by stamping in a manner known to those skilled in the art. All of the other items such as the clamp 166, tubing such as the tubing 152 and 158, the T-filling 30, all of the various screws and other fasteners such as the screws 112 and 126, and the electrical conductors such as the wire or cable 164 and the conductor 54 are all readily available or made in a manner known to those skilled in the art from readily available materials.

In view of the previous discussion related to the relative positioning of the various parts of the pressure transducer 10 and the drawings anyone skilled in the art can assemble the pressure transducer 10. It should be noted that the components associated with the magnet assembly 62 should be in vertical alignment with the components associated with the M-shaped springs 82 and 102. The trimmer 52 can be fixed in position by gluing it to the upper surface of the housing member 12 using suitable glue known to those skilled in the art such as Loctite Bonder number 430. The transducer would of course have to be wired in a conventional manner in accordance with either the wiring diagram or schematic of FIG. 6 or FIG. 7.

In order to reduce the necessity of maintaining close tolerances related to the nozzle means 20 including the nozzle member 22 and the nozzle insert 32 thin washer shaped shims are provided that are designated by the numbers 192 and 194. These shims 192 and 194 are locatable around the nozzle member 22 between its enlarged flange 24 and the adjacent lower surface 196 of the underside of the housing member 12. These shims are means associated with the nozzle means 20 for compensating for different dimensional tolerances of the nozzle means including the nozzle member 22 and the nozzle insert 32. The shims 192 and 194 are added and or removed as necessary during the assembly process to set the height or distance of the upper or outer end 196 of nozzle insert 32 of the nozzle member 22 from the surface 194 of the housing member 12. These shims such as the shims 192 and 194 should be of different thickness in the range 0.010 inch, 0.015 inch and 0.020 inch thick and they should be color coded for easy identification during assembly.

In the preferred embodiment, a 20 PSIG test gage (not shown) is connected to the output tube 150 and 20 PSIG supply pressure is introduced into the input tube 152 with the housing member 12 and associated structure being in its vertical position. Shims such as the shims 192 and 194 are then added or removed to obtain an output reading of 3 PSIG when the outer end portion of the zero control spring 98 is in a level to very slightly above level position. After this the maximum output is tested by pushing down on the spherical ball 38 by putting downward finger pressure or the like on the nut 80. The maximum output should be 19.0 to 20 PSIG. The stop screw 128 is then set by first backing off the zero screw 126 and then setting the stop screw 128 to obtain from about 0.1 to about 0.3 PSIG output on the gage. The the zero screw 126 is reset to obtain a 3 PSIG output and the trimmer 52 is adjusted to obtain the appropriate high PSIG reading with the low electrical signal and the appropriate high PSIG reading with the high electrical signal. The respective low and high PSIG readings in the preferred embodiment are about 3 PSIG and about 15 PSIG. It will of course be appreciated that other outputs could be obtained as desired by those skilled in the art.

In order to use the pressure transducer 10 it is suitably located in an upright position by means of the bracket 176 and the input tube 152 is connected to a suitable source of pressurized supply fluid. The output tube 150 is connected in a suitable desired manner to equipment (not shown) that is to be subjected to a variable fluid pressure. The circuitry of the transducer will correspond to that in FIG. 6 if a variable voltage input is to be used or to that in FIG. 7 if a variable current input is to be used. The electrical input will then cause upward or downward movement of the spherical ball 38 that will vary the amount of fluid that is allowed to escape through the nozzle insert 32 of the nozzle number 22. It should be noted that an increase in voltage or current will cause an increase in downward pull on the magnet assembly 62 and hence an increase in the pressure in the tube 150.

The pressure in the nozzle insert 32 acts to push the ball 38 upward with an effective area nearly equal to the area of the small hole in the nozzle insert 32. If the force caused by the pressure against the ball 38 is more than the downward force caused by the reaction of the magnet 62 and electric current, the ball 38 lifts the magnet assembly causing the air behind the nozzle insert 32 to exaust until a balance condition exists and the output pressure in the tube 150 is lowered, thus the output pressure and electric signal are in a nearly linear relationship. For 4 to 20 milliampere input will give a 3 to 15 PSIG output.

This nearly linear relationship is made possible by the unique shape of the M-shape springs 82 and 102 that allow free vertical movement of the magnet 62 and associated structure but hold the magnet 62 and associated structure rigidly centered with respect to the coil assembly 44 in the horizontal plane. It should be noted that the recessed areas in the nozzle only serve to guide the ball 38 and slots such as the slot 35 serve only to allow the air or fluid to escape. This escaped air or fluid leaves the transducer 10 by the vent 188. If desired the relationship of input current to output current may be reversed by reversing the current direction and adjusting the zero spring. The basic force balance relationship for transducer 10 is:

$$P \times A = F - (R \times D) + K$$

Where:

F = Resultant Force Produced by Coil & Magnet—IN. LBS.

R = Total Rate of Spring System—LBS PER IN.

K = Zero Spring Setting—LBS.

P = Output Pressure in the Output Tube 150 and in the Nozzle Insert 32—PSIG

A = Area of Small Hole in Nozzle—SQ. IN.

D = Ball Travel from Setpoint—IN.

Should the nozzle member 22 and its associated nozzle insert 32 need cleaning, repair or replacement, it can easily be readily removed by merely unscrewing the screw 162 and then by pulling down on the nozzle member 22 or the connected T-filling 30. The cleaned, repaired or replacement nozzle member 22 can then be easily inserted into the bottom of the housing 12 and secured in place by the screw 162.

Although the invention has been described in considerable detail with reference to a certain preferred embodiment, it will be understood that variations or modifications may be made within the spirit and scope of the invention as defined in the appended claims.

What is claimed is:

1. An electric to pneumatic transducer comprising a housing, nozzle means for releasing air or a gas or gases located in said housing, inlet means for transmitting air or a gas or gases to said nozzle means, magnetic means acting upon said nozzle means for varying the amount of air or a gas or gases released from said nozzle means and electrical activating means operatively associated with said means for acting upon said nozzle means for controlling said magnetic means for acting upon said nozzle means in accordance with an electrical signal, said magnetic means for acting upon said nozzle means including means for limiting lateral movement thereof and for permitting reciprocal movement thereof comprising spring means, said spring means comprising a plurality of substantially M-shaped leaf springs.

2. The electric to pneumatic transducer of claim 1 wherein said plurality of substantially M-shaped leaf springs are substantially identical.

3. The electric to pneumatic transducer of claim 1 further comprising means associated with said nozzle means for permitting ready access to said nozzle means.

4. The electric to pneumatic transducer of claim 3 wherein said nozzle means comprises a nozzle member said housing has an aperture for receiving at least a portion of said nozzle member and wherein said means for permitting ready access to said nozzle member comprises a connecting member engaging said housing and a portion of said nozzle member.

5. The electric to pneumatic transducer of claim 4 wherein said connecting member is removable from said housing.

6. The electric to pneumatic transducer of claim 5 wherein said connecting member comprises a screw locatable in a hole in said housing.

7. The electric to pneumatic transducer of claim 1 futher comprising means associated with said nozzle means for compensating for different dimensional tolerances.

8. The electric to pneumatic transducer of claim 7 wherein said means for compensating for different dimensional tolerances comprises at least one shim.

9. The electric to pneumatic transducer of claim 8 wherein said means for compensating for different dimensional tolerances comprises a plurality of shims.

10. The electric to pneumatic transducer of claim 9 wherein said plurality of shims are color coded.

* * * * *